Dec. 13, 1932.   R. BARROS   1,891,038
AUTOMATIC FILLER
Filed March 24, 1930

Inventor
Raman Barros
By his Attorney
George C. Heinicke

Patented Dec. 13, 1932

1,891,038

UNITED STATES PATENT OFFICE

RAMÓN BARROS, OF CORDOBA, ARGENTINA

AUTOMATIC FILLER

Application filed March 24, 1930. Serial No. 438,596.

The present invention relates to improvements in automatic fillers, and particularly to automatic fillers for cereals, grains, liquids, etc. in bulk, which improvements by their simplicity represent a great economy in the construction of such machines, apart from the exact manner in which they fulfill their work, and are especially adaptable for use with all classes of cereals, grains, and even for liquids inasmuch as the technical principle disclosed enables the device to be constructed for application to numerous substances and materials.

In order that my application may be more comprehensible, I have illustrated same with various figures, in which.

Construction

Figure 1:
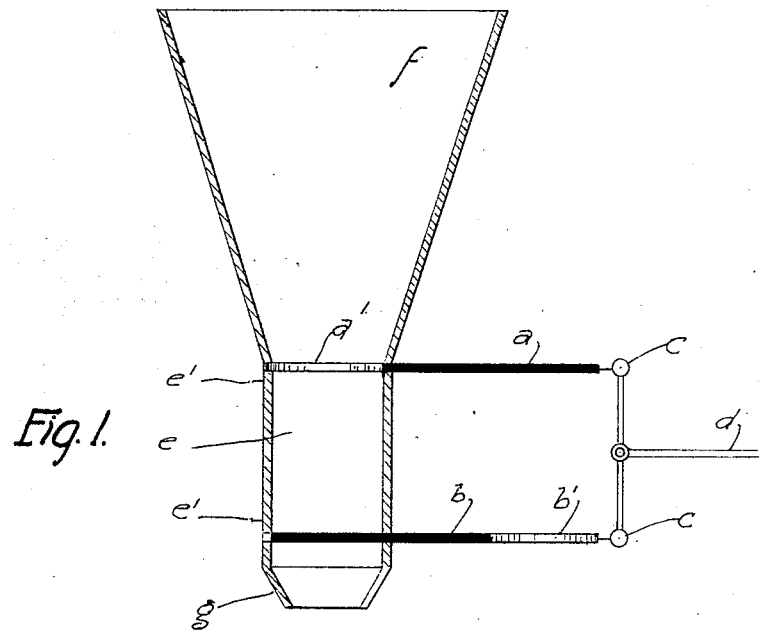
Fig. 1 is a diagrammatical sectional view of a hopper and the device or improvement for the automatic filler.
Figures 2, 3:
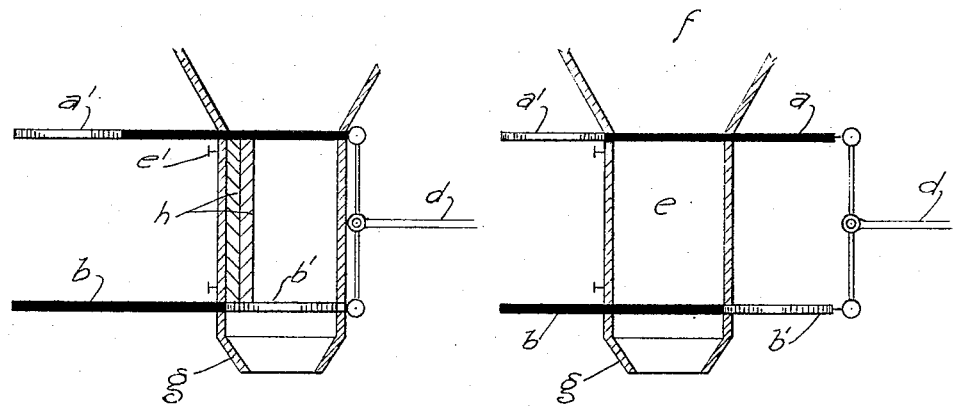
Fig. 2 is a diagrammatical view showing the improvement or device for filling in its second position.
Fig. 3 is a view similar to Fig. 2, with the device in its third position.

The device comprises two obturators $a$ and $b$, Figs. 1, 2 and 3, formed by two sheets of metal or other material suitable for the purpose for which they are intended, joined at the points $c$ to a connecting rod $d$, the eccentric point of which may be placed where found most convenient for the object of obtaining an oscillating movement, the obturators sliding in grooves which separate the measuring chamber $e$ from the hopper $f$ and the measuring chamber from the lower part $g$.

The measuring chamber $e$ represents the measure of the volume required, and to reduce same the supplementary plates $h$ are introduced therein through door $e^1$.

The hopper $f$ is placed above the measuring chamber $e$, and allows the substance or material which it holds to fall, as soon as the obturator $a$ enters into play.

Working

The working of the device is quite simple, its excellence residing precisely in its simplicity, and by its means it is possible to avoid the employment of delicate and complicated devices, which are always liable to disorders, and consequent loss of time.

Fig. 1 shows the pair of obturators $a$ and $b$ in their first phase; the obturator $a$, constituted by a sheet perforated to suit the diameter of the measuring chamber $e$ at one end as at $a^1$ which allows the material which is found in the hopper $f$ to fall, but the lower obturator $b$ acts at this moment as the base or bottom, and the measuring chamber $e$ becomes completely filled. The lower obturator $b$, the same as its fellow upper obturator $a$, is perforated at the opposite end $b^1$.

Immediately after the material falls into the measuring chamber $e$, the eccentric compels the connecting rod $d$ to act, and the latter pushes the pair of obturators, passing to the second phase, as is shown in Fig. 2. The upper obturator $a$ acts as a horizontal cutter, leveling the material, and leaving in the measuring chamber $e$ the exact volume desired. The eccentric point which works the connecting rod $d$ continues in its travel and pushes the pair of obturators $a$ and $b$ always in the same direction.

Fig. 3 shows the final step where the perforated part $b^1$ of the obturator $b$ allows the measured material present in the measuring chamber $e$ to fall into the lower part $g$. To this lower part $g$ is attached the packet, bag or other wrapper which it is desired to fill.

After the connecting rod $d$ returns to its starting point, the operation described can be indefinitely repeated.

When the measuring chamber $e$ is found to be too large or of a greater diameter than is required, the supplemental walls $h$ (Fig. 3) are added in its interior, in the number and size required to obtain the desired volume.

Claim

Having now particularly described and ascertained the nature of my said invention and in what manner the same is to be performed, I declare that what I claim is: "Improvements in automatic fillers", constituted:

In a measuring device, a measuring chamber, a pair of obturator plates, having openings at opposite ends of the same diameter as the chamber, means connecting said plates at one end, and eccentrically controlled means to operate said plates successively to open the upper end of said chamber by the operation of the upper plate, allowing a filling of said chamber and closing its upper and lower ends, and open the lower end of said chamber for the discharge of its contents, said lower plate maintaining the discharge opening closed during the opening, filling and closing operation of the upper plate, a door for said chamber, supplementary plates adapted to be introduced into said chamber through said door to regulate the volume of the chamber and means for attaching the supplementary plates to said door.

In testimony whereof, I affix my signature.

RAMÓN BARROS.